United States Patent [19]

Sarwin

[11] Patent Number: 4,521,677
[45] Date of Patent: Jun. 4, 1985

[54] PRODUCT CONTROL SYSTEM FOR SUPERMARKETS AND THE LIKE

[76] Inventor: Herbert S. Sarwin, 511 Milburn Ave., Short Hills, N.J. 07078

[21] Appl. No.: 557,626

[22] Filed: Dec. 2, 1983

[51] Int. Cl.³ .................. G06F 15/24; G06F 15/26
[52] U.S. Cl. .................. 235/385; 235/383; 235/472
[58] Field of Search .................. 235/385, 383, 472

[56] References Cited

U.S. PATENT DOCUMENTS 4,180,264 12/1979 Koenig .................. 235/385

Primary Examiner—Harold I. Pitts
Attorney, Agent, or Firm—Karl F. Ross; Herbert Dubno

[57] ABSTRACT

A supermarket or like vending establishment equipped with a computer having a bar code reader at a checkout counter or terminal. The various shelves for the various items are provided with respective bar codes equipped with individual electronic displays linked to the computer so that these displays can display data at least in part coordinated with the bar code of the respective items stored there above so that the individual items need not be provided with price labels or the like.

9 Claims, 3 Drawing Figures

PRODUCT CONTROL SYSTEM FOR SUPERMARKETS AND THE LIKE

FIELD OF THE INVENTION

My present invention relates to a product control system for supermarkets and the like and, more particularly, to a system for displaying information regarding a shelved product in a supermarket or other vending establishment which can be coordinated with the inventorying and purchase-handling facilities of a supermarket.

BACKGROUND OF THE INVENTION

In the more modern supermarkets, checkout counters are not only equipped with cash registers and like terminals which may be coupled with a store computer or even a computer associated with a chain of stores for recording the purchase, calculating the total cost and, possibly, controlling the store inventory as a result of the particular purchase, but also with automatic devices for responding to the particular product purchased so as to facilitate checkout and inventorying processes.

To this end, practically all products available for sale in a supermarket or like establishment and certainly almost all staples, are packaged in such a way that a bar code is provided upon the item and can be detected by a laser pick up of a bar code reader when the item is passed over or in the region of the bar code reader.

The information contained in the bar code generally identifies the particular product and this identification is detected by the bar code reader and fed to a computer which determines the price of the particular article or item and automatically records this price at the checkout terminal. Simultaneously, the computer can monitor the number of each particular item sold as an inventory control measure and can even be programmed to order the particular item as stocks are depleted or to maintain a particular level of such stocks.

However, the consumer is not readily able to ascertain anything of value from the bar code. For this reason, items are generally packaged with various indicia identifying the contents, ingredients and net weight or other indication of the quantity of the contents of a particular package.

It is also imperative for effective supermarket communications that the particular package be labeled with the price of the package and, possibly, with other information including date of packaging, price per unit weight (unit price) and whatever other indicia may be necessary to permit a shopper to exercise proper judgement.

In supermarkets, however, the pricing or price labeling of individual items is a time consuming and expensive practice and the failure of such labeling frequently leads to slow downs at checkout counters and interference with routine processing of supermarket sales or purchases. There also may be changes in prices because of increased cost or a promotional sale. These changes may not be evident to the customer. Furthermore the conventional systems inhibit spontaneous sales or promotional price reductions.

OBJECTS OF THE INVENTION

It is the principal object of the present invention to provide a supermarket product control system which avoids the above-mentioned drawbacks and can greatly reduce the cost of operating a supermarket.

Another object of the invention is to provide an improved apparatus which eliminates the need to individually price mark items in a supermarket or other commercial establishment.

Yet a further object of the invention is to facilitate display of information of a particular product.

SUMMARY OF THE INVENTION

These objects and others which will become apparent hereinafter are attained, in accordance with the present invention which is based upon the provision of an electronic readout on the shelf or other storage unit accommodating each item which can be set by the store or chain computer, in accordance with the location or address of the particular item stored on the shelf or other storage unit and the particular pricing information stored in the computer and associated with the product on the shelf. The readout can reveal information embodied in the bar code of the particular product or associated therewith and derived from a master file that is stored in the computer. The alphanumeric display can be hard wired to the computer or connected by a wireless transmission system therewith.

More particularly, the system of the present invention provides a liquid crystal or other electronic display at each product location (e.g. shelf) which may display the name of the item, the unit price and the cost price per article, a computer adapted to set the respective display and a bar code reader at at least once checkout terminal capable of reading the bar code on the item as it is checked out. Input means is provided for the computer to enable the setting of the display which at least in part is determined by the respective data in a master file corresponding to the bar code on the item and, to this end, the input means or input terminal can likewise be provided with a bar code reader.

The display can be directly coupled to the computer or can be coupled to the computer indirectly, e.g. by wireless transmission or any other remote signal transmitting means.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
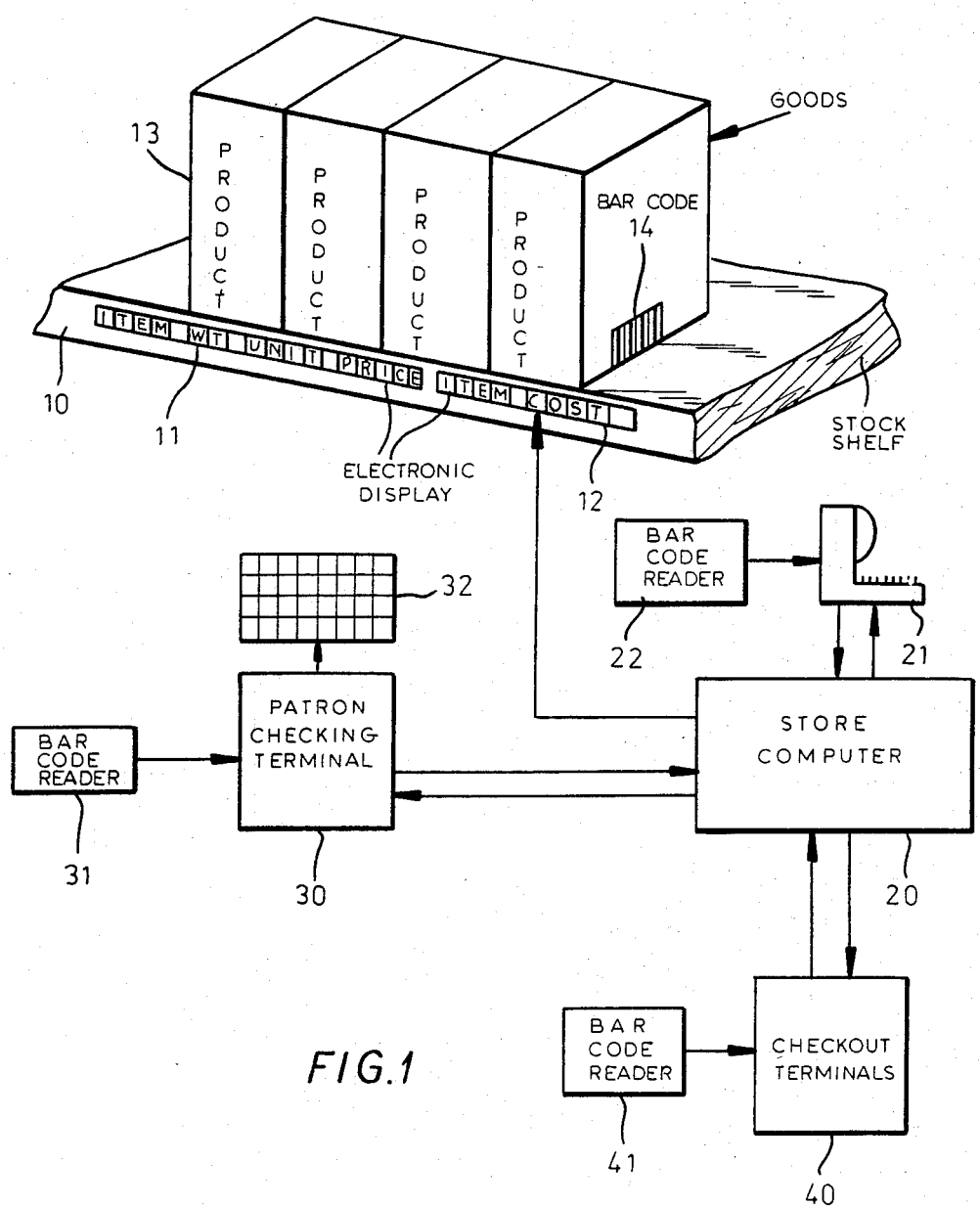
FIG. 1 is a block diagram illustrating the principles of the present invention.

In FIG. 1 of the drawing, I have illustrated the principles of my present invention. In a supermarket equipped with the system of this invention, each shelf 10 carrying goods displayed for marketing is equipped with a linear electronic display, here shown to be broken into two sections 11 and 12, each of which can display alphanumerically a multiplicity of items of data in a relatively short length. The length need not exceed the length of the shelf required for a particular item and, if desired, two or more rows of information can be provided in the display. Such displays can be of the type marketed under the designation 16 SEGMENT SOLID STATE, ALPHANUMERIC DISPLAY, HDSP-6504, HDSP- 6508 by Hewlett Packard. In areas where limited space is available there may be more than one product in an address area. Therefore different data may be displayed at frequent intervals so as to describe the products on the shelves.

On the shelf 10, purely diagrammatically, a number of packages 13 of a particular product can be seen, each package being provided in the usual way with a bar code which identifies the net weight or volume, the particular item, date of packaging and other data which may be desirably recorded on each package. Note that the packages 13 are not provided with individual price labels. However, these packages are placed upon the shelf 10 in the region of the electronic display which, as illustrated, can identify the item, can provide the unit price, can provide the net quantity and can even identify the cost per package.

Figure 2:
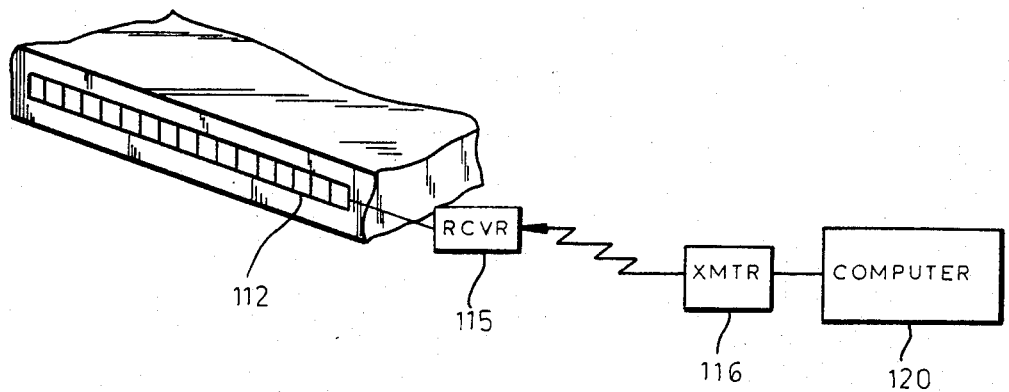
FIG. 2 is another block diagram illustrating an aspect thereof.

The electronic display is set by the store computer which can be connected directly to each of the displays or indirectly to each of the displays as indicated in FIG. 2.

In this embodiment, the shelf display 112 is connected to a receiver 115 which receives an input from a transmitter 116 at the computer 120. In other words, each display or each group of displays may be set by wireless transmission of data from the computer. A cable connection to the computer can also be used.

Reverting to FIG. 1, it will be apparent that the input to the store computer 20 can be by way of the input terminal 21 which can be equipped with a bar code reader 22 (e.g. the IBM 3666 Checkout Scanner which is capable of reading the universal product code). Thus when the computer (e.g. IBM model 3660 or 3651) is to be advised of the number of items of a particular article in stock, the item can be identified to the computer by running one of the packages 13 over the bar code reader and then introducing via the keyboard of the terminal 21, the price data, number of items in stock and like information. When this information is introduced into the computer and the computer receives a command from the input terminal 21 accordingly, the shelf display can be set or reset to indicate the newly introduced data. The stocker need merely place the items, without individual labeling, upon the appropriate shelf.

Naturally, when a patron, having removed the item from a shelf, is desirous of checking as to whether the shelf data is accurate, he or she can take the item to a patron checking terminal 30 which is linked with the computer 20 and run the package over the bar code reader 31 at this terminal. The electronic display 32 will display the items which were originally on the shelf display including price so that the patron can be assured that, upon checkout, the checkout terminal will similarly respond.

The checkout terminals 40 are likewise equipped with bar code readers and have the usual cash receiving facilities, displays and the like.

Reference may be had to IBM 3660 Supermarket Systems: SCANNING SYSTEM INTRODUCTION, KEY-ENTRY SYSTEM PROGRAMMER'S GUIDE, and IBM CHECKOUT SCANNING PRIMER.

For an update from the master file with a new address or location of the goods with a particular product code, the keyboard of the input terminal 21 can signal the computer 20 to respond to a new input at bar code reader 22 and additional data introduced by keyboard to automatically change the display. The stocker then removes any remaining old stock from the shelf and replaces it with the stock associated with the new information.

Figure 3:
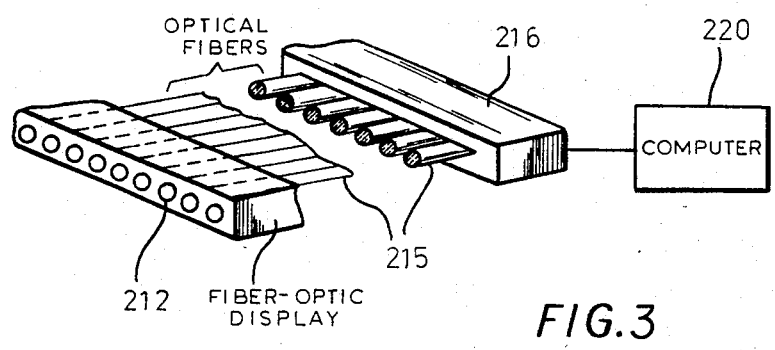
FIG. 3 shows another design.

The display (FIG. 3) can be a fiber optic unit 212 which is coupled with the light source 216 by the optical fibers 215. The source 216, which transmits the alphanumeric images to the optical fibers 215, is controlled by the computer 220 in the manner previously described for generating the display.

I claim:

1. In a product handling system for a vending establishment comprising a computer, a checkout terminal linked to said computer, a bar code reader at said checkout terminal for identifying a purchased item, the improvement which comprises a respective electronic display at each of a plurality of shelving rotations for respective items having bar codes, each of said displays being linked to said computer for displaying indicia at least in part assigned to the bar codes of the items stored at the respective shelf sections.

2. The improvement defined in claim 1, further comprising input means for said computer including at least one bar code reader responsive to the bar codes on said items for correspondingly setting said displays.

3. The improvement defined in claim 1, further comprising a patron checking terminal provided with at least one bar code reader and a further electronic display responsive to the bar code reader for displaying indicia corresponding to the indicia of the respective section for a particular item upon the scanning of the bar code of said item by the bar code reader of the patron checking terminal.

4. The improvement defined in claim 2, further comprising a patron checking terminal provided with at least one bar code reader and a further electronic display responsive to the bar code reader for displaying indicia corresponding to the indicia of the respective section for a particular item upon the scanning of the bar code of said item by the bar code reader of the patron checking terminal.

5. The improvement defined in claim 1, further comprising a wireless information transmitting link between said display and said computer.

6. The improvement defined in claim 1, further comprising a cable forming an information transmitting link between said displays and said computer.

7. The improvement defined in claim 5, further comprising a patron checking terminal provided with at least one bar code reader and a further electronic display responsive to the bar code reader for displaying indicia corresponding to the indicia of the respective section for a particular item upon the scanning of the bar code of said item by the bar code reader of the patron checking terminal.

8. The improvement defined in claim 1, further comprising an optical fiber information transmitting tube between said displays and said computer.

9. The improvement defined in claim 6, further comprising a patron checking terminal provided with at least one bar code reader and a further electronic display responsive to the bar code reader for displaying indicia corresponding to the indicia of the respective section for a particular item upon the scanning of the bar code of said item by the bar code reader of the patron checking terminal.

* * * * *